Patented June 1, 1948

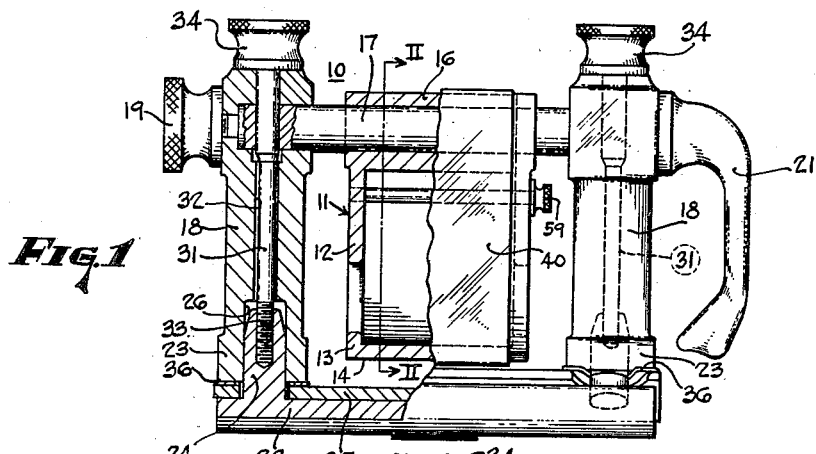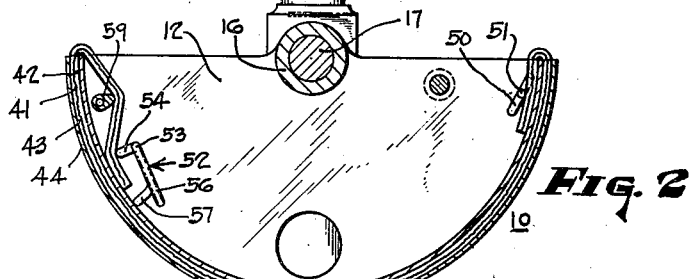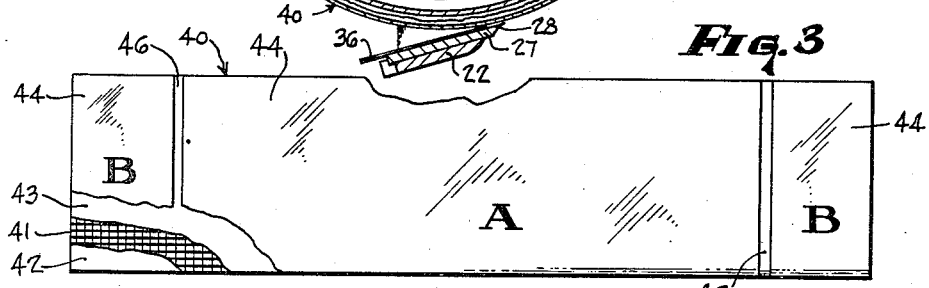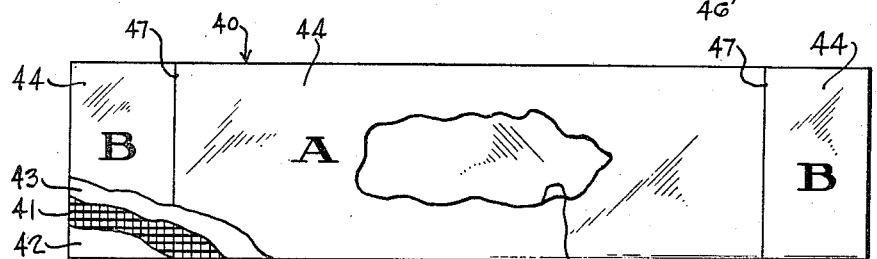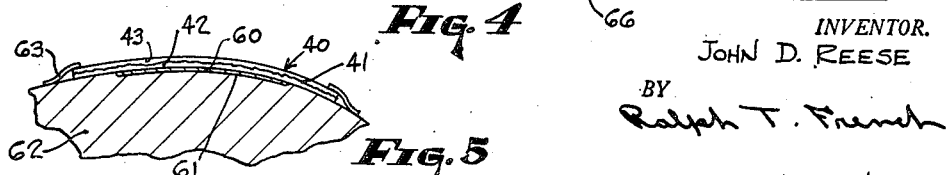

2,442,433

UNITED STATES PATENT OFFICE 2,442,433

SKIN GRAFT TRANSFER MEMBER

John D. Reese, Philadelphia, Pa.

Application March 21, 1945, Serial No. 583,983

7 Claims. (Cl. 128—305.5)

This invention relates to surgery, more particularly to skin grafting, and has for an object to provide an improved method of cutting a skin graft.

Another object of the invention is to provide improved apparatus for cutting a skin graft.

Yet another object of the invention is to provide an improved graft-receiving member.

Another object of the invention is to provide a graft-transfer member by which a graft may be transferred from a donor area to an injured area, without the application of any strain to the graft tending to affect its shape.

While the improvements of the present invention may be used with dermatomes of almost any type, including those having a flat working face, they are particularly applicable to the type having a convex working face, as illustrated by United States Letters Patent No. 2,288,709, granted July 7, 1942 to G. J. Hood, and applicant's prior Patent No. 2,366,054, granted December 26, 1944.

In using dermatomes of the latter type, it has been the practice to apply a coat of liquid adhesive or cement to the convex working face and a similar coat to the skin of the donor area, or to stick to the dermatome working face a rubber sheet of proper size and shape which is coated on both sides with a soft adhesive rubber compound. The convex face is then rolled on the adhesive-coated donor area, and simultaneously a knife, supported by the dermatome for reciprocatory and oscillatory movement parallel to the convex face, is given a cutting motion to separate the graft from the donor area as the skin thereof is raised by the adhesive during the rolling action. After completion of the cutting operation, the graft is removed from the adhesive, applied to the injured area, and retained in position thereon by sutures or clamps.

Where the convex surface is coated with adhesive or cement, the difficulty is frequently encountered that the coating pulls away from the surface in spots, with the result that at such spots the skin is not raised, and the knife cuts holes in the graft. The same difficulty arises where the rubber sheet, coated on both sides with rubber adhesive is relied upon, as the adhesive retaining the rubber sheet on the dermatome convex face likewise tends to pull away in spots, resulting in the cutting of holes in the graft. Also, it has been proposed to retain a rubber sheet, having adhesive on only its outer skin-engaging face, in position on the convex working face of a dermatome, solely by suction. Here again, difficulty may be encountered in obtaining a satisfactory graft, mainly because of failure of the graft-receiving rubber sheet to remain tight against the dermatome, due to unreliability of such suction apparatus. Whether the rubber sheet is held in place by adhesive or by suction, it is subject to wrinkling or partial separation from the dermatome because of non-uniformity of securing action.

Therefore, another object of the invention is to provide, in a dermatome, means for positively securing a graft-receiving member against a convex working face, with the contact pressure between the member and the face uniform at all points therebetween.

It is a further object of the present invention to overcome the above-mentioned difficulties by the provision of a graft-receiving member of flexible material, having a smooth dry inner surface adapted to engage the working face of the dermatome, and an adhesive-coated outer surface for adhesion to the skin of the donor area, said member also having attaching portions at its ends, by which it may be mechanically attached to the dermatome and held taut against the convex working face thereof.

Another object of the invention is to provide a dermatome having means for mechanically securing against its working face, a graft-receiving member of flexible material.

Yet another object of the invention is to provide a dermatome having means for mechanically securing to its working face, a graft-receiving member of flexible material, together with means for drawing said member taut against said working face.

These and other objects are effected by the invention as will be apparent from the following description and claims taken in accordance with the accompanying drawing, forming a part of this application, in which:

Fig. 1 is a front elevational view, partially in section, of a dermatome embodying features of the present invention;

Fig. 2 is a vertical sectional view, taken along the line II—II of Fig. 1, looking in the direction indicated by the arrows;

Fig. 3 is a plan view of a graft-receiving or graft-transfer member, constructed in accordance with the present invention, portions thereof being broken away at one corner to more clearly illustrate the laminated construction;

Fig. 4 is a view similar to Fig. 3, showing a modified graft-receiving member; and, Fig. 5 is a fragmentary sectional view of the injured area of a patient's body, showing a skin graft retained thereon in accordance with the teaching of the present invention.

Referring now to the drawing more in detail, particularly to Figs. 1 and 2 thereof, the reference character 10 indicates, in its entirety, a dermatome comprising a body portion 11 in the form of a semi-cylindrical drum made up of a spaced pair of semi-cylindrical side walls 12, joined by a curved end wall 13 having an outer convex working face 14. The side walls 12 carry a bearing 16, bridging the space between the side walls and positioned so that its longitudinal axis coincides with the axis of generation of the convex working face 14.

A shaft 17 is journaled in the bearing 16 for both rotary and reciprocatory movement relative to the body member, and carries at its terminal portions a pair of posts 18, which extend radially relative to the convex working surface 14, in parallel, spaced apart relation, with the spacing therebetween considerably greater than the width of the body member or drum 11, to provide for reciprocatory movement of the shaft 17 and posts 18 relative to said body member.

The posts may be retained on the shaft terminal portions by a pair of knurled finger nuts 19, although preferably, a handle or finger piece 21 is used in place of one of the knurled nuts 19 to serve as a more suitable grip for the hand of the operator when reciprocating the shaft.

A blade-supporting bar 22 is carried by the outer ends 23 of the posts, and is provided with a pair of lugs 24, slidably received in bores 26, formed in the post ends 23.

A knife 27 is adapted to be supported of the bar 22, with its cutting edge 28 in parallel relation to the convex surface 14 of the drum.

A pair of rods 31, rotatable in bores 32 of the posts, have threaded connections at their inner ends 33, with threaded bores in the lugs 24. The outer ends of the rods 31 carry knurled finger pieces 34, by which the rods may be rotated to move the lugs longitudinally of the bores 26 in which they are positioned, inward movement of the lugs serving to draw the bar 22 towards the ends of the posts to securely clamp the knife 27 thereagainst.

Adjustment of the spacing of the knife with respect to the convex working face 14 is obtained by inserting between the knife and the post ends 23, shims 36, of the desired thickness.

The structure so far described constitutes, of itself, no part of the present invention, being already known to the art, and a more complete description of the details of construction may be obtained from applicant's prior patent, previously referred to.

The present invention provides for use of a skin graft-receiving or graft-transfer member 40, in the form of a flexible sheet. As best shown in Figs. 2 and 3, the graft-transfer member 40 comprises an intermediate strip of fabric 41 which is so disposed with respect to the sheet that the warp threads extend lengthwise, thereby rendering the flexible sheet substantially inextensible in a lengthwise direction, the fabric having permanently secured to the lower face thereof, as viewed in Fig. 3, a coating or layer 42 of rubber, whose surface which is away from the fabric is dry and smooth, for a purpose to be hereinafter set forth.

On the upper face of the fabric 41 is permanently secured a coating or layer 43 of rubber, whose surface which is away from the fabric is of an adhesive character. To protect the adhesive surface, the latter is covered with a strip of protective material 44 preferably of cloth which has been starched, varnished or otherwise processed.

The graft-transfer member 40 is of a width slightly less than the distance between the body member side walls 12, and of a length materially greater than the developed length of the convex working face 14 of the body member, the excess length constituting securing portions B, at each end of the strip, and the remaining intermediate section constituting a skin-contacting portion A.

In use, the graft-transfer member 40 is applied to the body member of the dermatome, with the smooth inner surface of the rubber layer 42 against the convex working face 14 of the body member, the intermediate skin-contacting portion A terminating adjacent the ends of the convex face. The securing portions B of the member 40 are drawn over the ends of the convexed wall 13 and the protective layer 44 may first be removed therefrom, although this is not generally necessary.

To permit ready removal of this protective layer 44 from the end securing portions B, without disturbing the protective layer covering the intermediate skin-contacting portion A, the protective layer 44 is provided with a break at the line where the portion A terminates and the portion B commences, as at 46 in Fig. 3. If desired, the protective layer may be merely weakened by a cut or by a row of serrations or perforations, indicated at 47 in Fig. 4.

Where the member 40 is attached without removal of the protective layer 44 from the attaching portions B, the breaks 46, or cuts or perforations 47, provide the "give" in the layer 44 which is necessary to permit the strip 41 to be drawn taut over the convex face of the body member.

The dermatome may be provided with any suitable means for mechanically securing the graft-transfer member 40 thereto. In the construction herein illustrated the side walls 12 are provided, adjacent one end of the curved wall 13, with a pair of slots 50, which are inclined towards said one end of the curved wall, relative to the inner surface of that wall. A knurled bar, or roller, 51 has its terminal portions mounted in the slots 50, for free rolling or sliding movement therein. The adjacent securing portion B of the graft-transfer member is positioned in the space between the bar 51 and the inner surface of the curved wall 13, any pull on the securing portion B in an upward direction, as viewed in Fig. 2, resulting in wedging of the bar 51 against the portion B, thereby preventing its withdrawal.

The securing portion B at the opposite end of the graft-transfer member may be held by a quick-release latch, or dog, 52, pivoted at 53 to the side walls 12, and having a grip 54 and handle 56, as well as a stop 57, the entire latch or dog 52 being of a well known construction, frequently used in buckles.

In order to hold the intermediate portion A of the graft-transfer member taut against the convex working face of the dermatome, there is provided a tightening rod 58, pivotally mounted in opposed openings in the side walls 12, and formed with a cam surface eccentric relative to its axis of rotation. One end of the rod 58 may extend beyond the corresponding side wall 12, and carry a knurled finger piece 59, by which the rod may be rotated to cause the cam surface thereof to raise the graft-transfer member where it passes thereover, to draw the member taut. In order to distribute uniformly throughout the length of the graft-transfer member the stress to which the latter is subjected when drawn taut by the cam rod 58, the inner, convex-face-engaging surface of the graft-transfer member is made smooth and dry, so that it may slip easily on said convex face.

Preferably, the protective layer 44 is left on the intermediate skin-contacting portion A until such time as the graft is to be cut, when the layer 44 is removed and the graft cut in a manner obvious to those familiar with dermatomes of this type.

Briefly, the dermatome is operated as follows in the cutting of a graft: The dermatome is applied to the body with one end of the skin-contacting intermediate portion A pressed against the skin of the donor area, the protective layer 44 having been removed from the portion A. The body member or drum is then rolled on the body with the adhesive layer 43 progressively raising the skin. Simultaneously with the rolling of the body member, and consequent raising of the skin, the knife is reciprocated relative to the body member and the skin to cut the latter in the form of a graft. Upon completion of the cutting, the entire graft-transfer member 40 is removed from the dermatome, and the graft applied to the injured area, preferably without removal from the graft-transfer member. It will be apparent that by leaving the graft on the graft-transfer member, shrinkage or wrinkling of the graft is prevented.

Further, after the graft and its transfer member have been applied to the injured area, the transfer member may be used to retain the graft in place, thereby eliminating the use of suture or clamps. Fig. 5 illustrates a graft 60 applied to the injured area 61 of a patient's body 62, the graft 60 being retained in place and protected by the graft-transfer member 40, to which the graft is still attached. Strips 63 of adhesive tape may be used to retain the graft-transfer member in place on the patient's body, as illustrated.

An important advantage of the use of a tautly drawn graft-receiving or transfer member, such as herein disclosed, is that a much thinner graft can be cut than would be possible if the graft were to be removed from the adhesive surface prior to being applied to the injured area. By the present invention, a graft of two-thousandths of an inch thickness may be cut and applied to the injured area without injury to the graft, whereas such a thin graft would be torn or otherwise damaged if it were removed from the adhesive coating prior to being applied to the injured area, and even if successfully removed would be clinically unmanageable.

Likewise, where the graft-receiving member is secured to the dermatome working face by adhesion, suction, or any means other than mechanical, the degree of surface contact, or the force tending to hold the member to the working face, will vary at different areas of the meeting surfaces, resulting in cutting of a graft of non-uniform thickness. If it is attempted to cut a graft as thin as two-thousandths of an inch, the graft is likely to be too thin in spots where the surface contact is slight, or even to have holes therethrough.

In the construction shown in Fig. 4, an opening 66 is cut by the operator in the protective layer 44, which opening is of the shape and size of the graft to be cut, the layer 44 overlying the remainder of the intermediate portion A serving to mask the adhesive layer 43, so that the donor area skin will adhere to the graft-transfer member only through the opening 66.

Preferably, the outer adhesive layer of rubber 43 has the characteristic that it will not adhere to rubber gloves, such as worn by surgeons. Also, it will absorb rubber cement applied to the skin of the donor area, which application is sometimes made to further insure positive adhesion of the skin to the graft-transfer member.

While the invention has been shown in a plurality of forms, it will be obvious to those skilled in the art that it is not so limited, but is susceptible of various modifications and changes, as well as other applications, without departing from the spirit thereof.

What is claimed is:

1. A skin graft-receiving member having securing portions at opposite ends thereof by which it is adapted to be held taut against the working face of a dermatome, and comprising a flexible strip of rubber, flexible and non-extensible means carried by said strip of rubber for preventing distortion of the latter while the member is held taut, the dermatome-engaging surface of said member being smooth and the opposite surface being of an adhesive character; and a strip of covering material removably secured to said adhesive surface to protect the latter prior to application of the graft-receiving member to a donor area of skin.

2. A skin graft-receiving and retaining member comprising an elongated strip of flexible material having securing portions at opposite ends thereof by which it is adapted to be temporarily retained in taut condition against the working face of a dermatome; said material comprising a relatively inextensible intermediate layer of fabric for preventing distortion of the strip while taut, a layer of rubber secured to one face of the fabric and having a smooth surface for contact with the working face of a dermatome, a layer of rubber secured to the opposite face of the fabric and having an adhesive surface for contact with the skin of a donor area, and a layer of fabric overlying said adhesive surface to protect the same prior to use and being removable to provide for exposure of the adhesive surface prior to cutting of the skin graft.

3. For use with a dermatome of the type comprising a body member having a working surface, a blade supported by said body member for cutting movement parallel to said working surface and at a predetermined distance therefrom, and means for holding a skin graft-receiving member taut against said working surface; a skin graft-receiving member comprising an inextensible strip of flexible material having securing portions at opposite ends thereof by which it may be held taut against the working surface of the dermatome, said strip having a smooth inner dermatome-engaging surface, whereby it may slide freely on said dermatome working surface to equalize the tension in said member when drawn taut, and said strip having an adhesive skin-engaging surface.

4. Structure as specified in claim 3, including means for protecting the adhesive surface of the strip of flexible material between the securing portions, said means comprising a sheet of fabric engaging and covering the skin-engaging portion of said adhesive surface and terminating short of said securing portions.

5. Structure as specified in claim 3, including flexible, inextensible material adhering to the adhesive surface from end to end of the graft-receiving member to protect said adhesive surface prior to securing of said graft-receiving member to the dermatome, the protective material overlying the securing portions of the member being separable from the protective material overlying the skin-engaging portion, whereby the last-mentioned protective material may be left in protecting position during and after securing of the graft-receiving member on the dermatome.

6. For use with a dermatome of the type comprising a body member having a convex surface, a blade supported by said body member for cutting movement parallel to said convex surface and at a predetermined distance therefrom, and means for holding a skin graft transfer member taut against said convex surface; a skin graft transfer member comprising a substantially inextensible strip of flexible material having securing portions at opposite ends thereof by which it may be held taut against the convex surface of the dermatome, and having an adhesive skin-engaging surface.

7. A skin graft-transfer member comprising an elongated laminated strip having securing portions at opposite ends thereof for retaining the strip taut against the working face of a dermatome, said laminated strip comprising a layer of vulcanized rubber, a layer of adhesive rubber, a layer of fabric inextensible longitudinally of the strip associated with the layer of vulcanized rubber for maintaining tautness of the strip while the latter is on the dermatome, and a layer of protective material, said last-mentioned layer covering the layer of adhesive rubber and including end portions overlying the securing portions of the strip and an intermediate portion overlying the remaining portion of the strip, said protective layer being weakened transversely at the junctions of its securing portions with its intermediate portion, whereby the latter portion may be removed from the remainder of the strip while the latter is taut on the dermatome, with the securing portions of the protective layer intact on the strip securing portions.

JOHN D. REESE.

REFERENCES CITED

The following references are of record in the file of this patent:

UNITED STATES PATENTS

| Number | Name | Date |
|---|---|---|
| 1,339,696 | Duffy | May 11, 1920 |
| 2,288,709 | Hood | July 7, 1942 |
| 2,366,054 | Reese | Dec. 26, 1944 |

OTHER REFERENCES

"Modification of the Plasma Fixation Method (Sano) of Skin Grafting by the Use of Bobbinet and a Mirror Attachment," J. A. Jenney, Surgery, Gynecology in Obstetrics, June 1945, vol. 80, #6.